United States Patent
Tahernezhaadi et al.

(10) Patent No.: US 7,113,514 B2
(45) Date of Patent: Sep. 26, 2006

(54) APPARATUS AND METHOD FOR IMPLEMENTING A PACKET BASED TELECONFERENCE BRIDGE

(75) Inventors: Mansour Tahernezhaadi, Naperville, IL (US); Michael J. Kirk, Mount Prospect, IL (US)

(73) Assignee: Motorola, Inc., Schaumburg, IL (US)

( * ) Notice: Subject to any disclaimer, the term of this patent is extended or adjusted under 35 U.S.C. 154(b) by 1060 days.

(21) Appl. No.: 10/076,255

(22) Filed: Feb. 13, 2002

(65) Prior Publication Data

US 2003/0152089 A1 Aug. 14, 2003

(51) Int. Cl.
*H04L 12/28* (2006.01)
*H04L 12/66* (2006.01)

(52) U.S. Cl. ...................... 370/401; 370/352
(58) Field of Classification Search ........... 370/401, 370/352, 263, 265, 266, 267, 260, 261
See application file for complete search history.

(56) References Cited

U.S. PATENT DOCUMENTS

| | | | | |
|---|---|---|---|---|
| 5,050,165 A | * | 9/1991 | Yoshioka et al. | 370/401 |
| 5,072,442 A | * | 12/1991 | Todd | 370/265 |
| 5,930,237 A | * | 7/1999 | Horiuchi et al. | 370/260 |
| 6,078,809 A | | 6/2000 | Proctor et al. | |
| 6,134,232 A | | 10/2000 | Ashley et al. | |
| 6,907,007 B1 | * | 6/2005 | Aznar et al. | 370/236.2 |
| 2001/0009549 A1 | * | 7/2001 | Aznar et al. | 370/393 |
| 2001/0055300 A1 | * | 12/2001 | Chen | 370/352 |

* cited by examiner

*Primary Examiner*—Huy D. Vu
*Assistant Examiner*—Blanche Wong

(57) ABSTRACT

A method and apparatus for effecting multi-party teleconferencing that avoids the need for tandem vocoding of packet based information from conference call participants. In particular, the teleconferencing bridge infrastructure utilizes packet tagging of encoded packets with a tag as well as adaptive scheduling of bandwidth to transmit packet based information to the end user call participants. Decoding is accomplished at each end user based on information included within the tag such that an appropriate decoding algorithm is selected for the packet-based audio information thereby avoiding tandem vocoding.

29 Claims, 2 Drawing Sheets

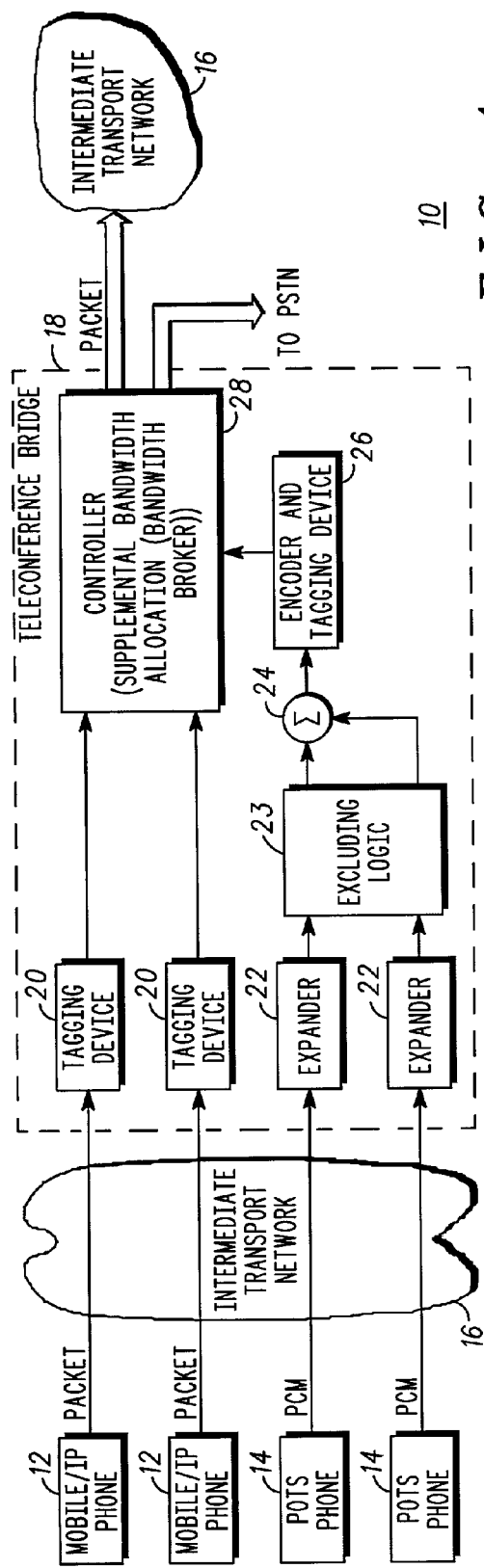
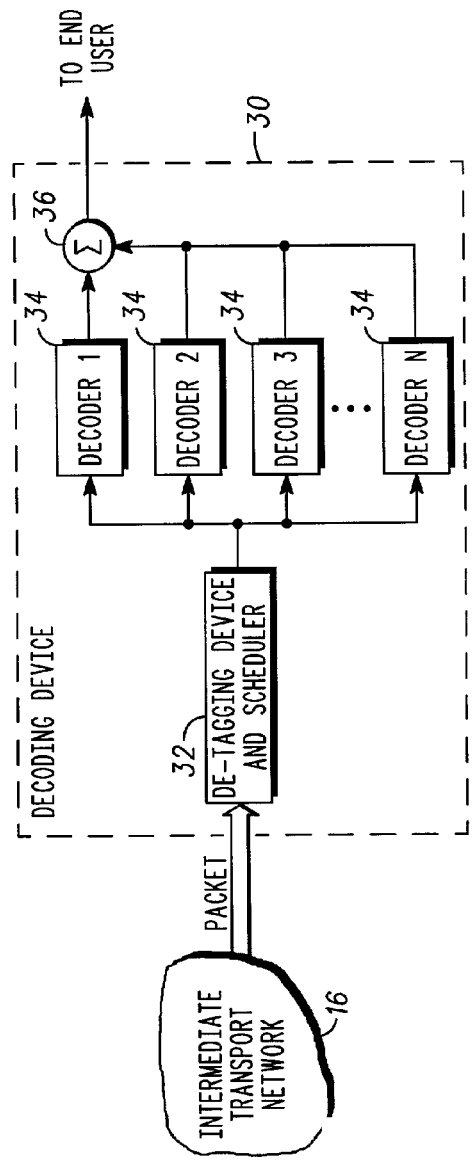
FIG. 1
FIG. 2

APPARATUS AND METHOD FOR IMPLEMENTING A PACKET BASED TELECONFERENCE BRIDGE

BACKGROUND

The present invention relates to an apparatus in method for a implementing a packet based teleconferencing bridge and, more particularly, to a teleconferencing bridge that avoids vocoding for packet-based communications.

In teleconferencing applications, typically a teleconferencing bridge is used to combine all received audio sources into a single audio source prior to transmission to destination points (i.e., the end user participating in a teleconference call). In the past, most teleconferencing bridges have received audio sources from public switched telephone network (PSTN) utilizing compressed pulse code modulated (PCM) format. With the rapid deployment, however, of mobile and Internet telephony, increasingly larger number of conference call participants present their audio source to the teleconferencing bridge in the form of a speech packet rather than in a compressed PCM formnat. Conventional bridges, however, simply decode all packets received from mobile or voice over IP (VoIP) users and sum them to produce a single audio source. Moreover, if there are any PSTN landline callers connected to the teleconferencing bridge, their compressed PCM speech samples are expanded and subsequently added to the single audio source so as to produce a final single audio source, which is, in turn, subsequently encoded for transmission to a packet based destination or, alternatively, may be PCM compressed for a landline destination point. The packet based destination points (e.g., mobile or Internet users), however, experience compromised speech quality due to the decode-encode-decode process, also known as tandem vocoding. Additionally, this tandem vocoding increases the round trip delay for the transmission of speech packets.

Attempts in the prior art to mitigate this compromised speech quality due to tandem vocoding have included utilizing a state machine that gives priority to active speech packets based on the speech rate of the packet from a multitude of received speech packets. An underlying assumption of this methodology is that one conferencing participant will be active in the span of several speech frames. If all or a number of the parties are talking simultaneously, however, the methodology will introduce packet loss. Additionally, voice quality in terms of maintaining the continuity of respective background noises when switching from one priority party to another may be annoying and lead to listener fatigue.

Another technique known in the prior art attempts to alleviate the associated problems of the above-described prior art methodology. This technique consists of allowing multiple decoders to run at the destination point and tying each decoder into a separate mobile supplemental channel (i.e., one decoder per supplemental channel). If a new participant wants to join a conference call, however, the infrastructure must free up an additional supplemental channel to add to the existing pool of supplemental channels, thereby utilizing greater system resources. Furthermore, it is required that all vocoders be of the same type. Hence, this technique in the prior art is very taxing on resources of the infrastructure and has less flexibility as all decoders must be of the same type.

BRIEF DESCRIPTION OF THE DRAWINGS

FIG. 1 illustrates a communication system for multi-party speech connection utilizing a teleconferencing bridge constructed in accordance with the teachings of the present invention.

FIG. 2 illustrates a decoding device for decoding signals sent from the teleconferencing bridge shown in FIG. 1.

DETAILED DESCRIPTION OF THE PREFERRED EMBODIMENTS

Figure 3:
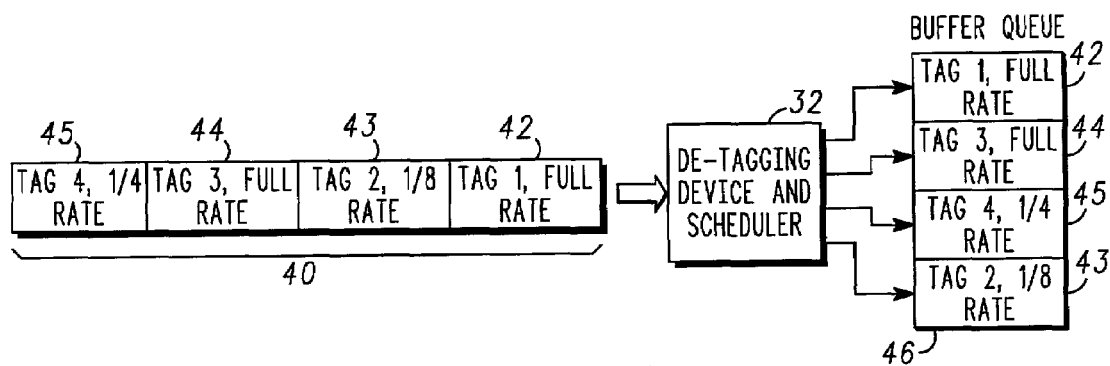
FIG. 3 illustrates the method of scheduling audio packets by the decoding device shown in FIG. 2.

The present disclosure provides a multi-party communication system utilizing a teleconferencing bridge that obviates the need for tandem vocoding for packet-based conference call participants. This is accomplished by providing a teleconferencing bridge that is configured to accept a number of different types of communication signals from multiple parties involved in a teleconference call. The teleconferencing bridge, in particular, includes one or more tagging devices that are each configured to respectively tag incoming communication signals from the multiple parties with predetermined information that is particular to the received packet signal. The teleconferencing bridge also includes a controller that is configured to combine the tagged signals into one or more data packet signals and then subsequently transmit the one or more data packet signals to each of the multiple parties involved in the conference call. Additionally, a decoding device for decoding the signals sent by the teleconferencing bridge is included for each participant in the multi-party teleconferencing call. The decoding devices are configured to utilize the tag information in order to direct the packets to an appropriate type of decoding routine for the particular packet signal. The use of the tag information obviates the need for decoding and subsequent encoding by the teleconferencing bridge, thereby requiring less infrastructure resources and, accordingly, maintaining a high level of speech quality.

FIG. 1 illustrates a communication system 10 wherein a multi-party communication may be effected. As shown, a teleconference bridge 18 for multi-party communication (i.e., teleconference calls) is configured to accept different types of communication signals received from multiple participants over an intermediate transport network 16. The participants may include mobile/Voice over IP phone users 12 that transmit packet based communication signals to the teleconference bridge 18. Additionally, the teleconference bridge 18 may accept signals in pulse code modulated (PCM) format from plain old telephone service (POTS) phones 14 over dedicated channels as indicated.

Within the teleconference bridge 18 are included tagging devices 20 that receive packet-based information from the Mobile or Voice over IP users 12. The tagging devices 20 are configured to tag an incoming signal from a call participant with a tag that may include predetermined information particular to that signal. For example, the tag may include information concerning the vocoder type needed to decode the packet-based information when it is received by the end user having a decoder or a decoding device, which will be explained later. Further information in the tag includes a user ID that is used to correlate the particular packet with the end user that has originated that particular packet. Other information included in the tag may include also the particular network server, particularly in the case of Mobile and Voice over IP users, that serves the originating user.

Once packets have been tagged by the tagging devices 20, they are passed to a controller 28 that combines the packets to be sent out back over the intermediate transport network 16, as will be described later. For audio signals originating from landline phone users 14, the teleconference bridge 18 includes expanders 22 that are used to expand the compressed PCM signal format in order to decode the audio information. The signals expanded and decoded by the expanders 22 are delivered to excluding logic 23. Functionally, the excluding logic 23 serves to exclude speech information from a particular POTS phone user to which a packet is being sent by the teleconference bridge 18, thereby precluding the POTS phone user 14 from hearing their own speech information. Hence, the excluding logic 23 serves to exclude and delay or buffer audio information until it is needed for inclusion in an audio packet to be sent over the intermediate transport network 16.

As signals are released by the excluding logic 23 they are, in turn, delivered to a summing device 24 that combines the decoded PCM signals into a single audio signal. This single audio signal is delivered to an encoder and tagging device 26. The function of the encoder and tagging device 26 is to first encode the single audio packet received from the summing device 24 into a packet-based audio format. Additionally, the encoder and tagging device 26 also tags the packet with the same type of information as the tagging devices 20 tag packets originating from mobile or IP users, for example.

Alternatively, instead of summing the decoded signals from the decoded signals from the expanders 22, each expander 22 may have an respective encoding and tagging device (not shown), similar to encoder and tagging device 26, that encodes each individual signal to a packet based format and appropriately tags the packet with information concerning the particular end user 14 originating the PCM format audio signal. This alternative would obviate the need for the summarizing device 24, as tagged signals could be delivered directly to the controller 28.

The controller 28 within the teleconference bridge 18 serves to assemble the tagged packets into a packet for transmission over the intermediate transport network 16, as well as having the function of bandwidth allocation for the packets being sent. Another term for this bandwidth allocation is "Bandwidth Brokering" wherein the controller 28 may allocate more or less bandwidth to be used dependent on the current state of the intermediate transport network 16. For example, if a high degree of traffic exists on the intermediate transport network 16 causing slower transmission delays, the controller 28 may be configured to adaptively arrange packets that it receives into a "superpacket" by multiplexing the packet signals received into a single large packet of audio information. In cases where the intermediate transport network 16 is not experiencing high traffic volume the controller 28 may then adaptively send packets received out serially over the intermediate transport network 16 without multiplexing these packets into a single packet. The ability of the controller 28 to broker the bandwidth used improves the scalability of the infrastructure since one single supplemental or dedicated channel in multi-task mode is sent from the teleconference bridge 18 to the caller participants with a single packet stream.

An additional function of the controller 28 is to address information sent out to a particular end user. Additionally, the audio information that originated from a particular user to which a packet is being addressed is deleted or omitted from the transmitted package by controller 28 such that the end user will not receive and, thus, hear their own transmitted audio information on their speaker. Accordingly, separate audio communication packets are sent to each respective user connection to the conference call and respectively omitting their own originated audio information.

Yet another function of the controller 28 is to track the number of participants currently connected to a multi-party call. This is accomplished by creating a call control table that tracks the number of participants to determine when existing participants drop out of the current multi-party call and when new participants join the call. The controller 28 then relays the information contained within the control table to each of the users over the supplemental channel transmitted over via the intermediate transport network 16. The control call table may utilize any known protocol that is used to facilitate messaging between a decoding device 30 (to be discussed later) and the infrastructure bridge 18 to inform the decoding device 30 of various types of information such as vocoder type, authentication, or a call tear down (i.e., when a mobile leaves the conference, thereby freeing up resources or addition of a participant).

Still another function of the controller 28 is to decode the packet based signals having a POTS phone or PSTN destination. The controller 28 then encodes the signal into a compressed PCM format that is transmitted by a dedicated channel to a POTS Phone 14 or PSTN as indicated.

In FIG. 2, an example of a configuration used by an end user in accordance with the teachings of the present invention is illustrated. It is noted that this configuration is the same for each user connected to a multi-party conference call. As shown, each end user has an associated decoding device 30. The decoding device 30 receives the packet information transmitted by the teleconferencing infrastructure 18 over the intermediate transport network 16. A De-tagging and Scheduling device 32 is configured to receive the packet information. The De-tagging and Scheduling device 32 first reads the information contained in the tags for each of the tag packets that have been sent by the infrastructure 18. Additionally, the Detagging and Scheduling device 32 receives information provided by the controller 28 that informs the decoding device 30 of decoder types that will need to be run. Thus, if the decoding device 30 does not support a particular decoder type, communication may be sent by the decoding device back to the controller 28 over the intermediate transport network 16 whereupon the controller 16 initiates a further function of decoding packet types not recognized by the decoding device 30 for that particular end user having that decoding device 30.

Another function of the De-tagging and Scheduling device 32 is to determine a queuing order of the received packets received in a predetermined sampling period in which the packets are sent sequentially to various decoders 34 within the decoding device 30. Concomitant with this function is the need to address which of the decoders a particular packet is to be sent based on the vocoder type for that particular signal. For example, a signal that originates from a mobile telephone user in a packet-based format will require an appropriate decoder that is configured to decode the packet-based information of that particular mobile telephone type. Each of the decoders 34 as shown in FIG. 2 decode a corresponding type of signal according to some predetermined decoding algorithm.

An additional feature of the decoders 34 is that they are configured to decode multiple signals of the same type but having different parameters. That is, a decoder having an algorithm to decode a particular vocoding type from a mobile user, for example, may be utilized to decode audio information received from a number of additional users connected to the conference call having mobile telephones issuing the same vocoder type of signals. In order to achieve this function, the decoding algorithms are configured to include multiple predetermined thread logic routines wherein each thread logic routine is assigned to a particular user originated signal and the signal's corresponding parameters whereas another thread logic routine would be used for another originating user that executes the same algorithm, but with that particular user's parameters.

Finally, the decoded signals output from the decoders 34 within the decoding device 30 are input into a summing device 36 to combine the decoded signals. Accordingly, a signal is output to a speaker or listening device (not shown) of the end user wherein the end user is allowed to hear the audio information from all other participants in the multi-party conference call.

As mentioned previously, the De-tagging and Scheduling device 32 establishes a queue for decoding the incoming signals. In order to accomplish this scheduling, a task scheduling algorithm is utilized within the De-tagging and Scheduling device 32 wherein the signals to be decoded are ordered according to the speech rates of the received packets. Preferably, those packets having higher speech rates are given a higher priority in the queue whereas packets with lower speech rates are given lower priority during a given sampling period.

An example of this scheduling is illustrated in FIG. 3. As shown, a received packet 40 that is either transmitted serially, as shown, or was multiplexed into a "superpacket" format is input to the task scheduling algorithm in the De-tagging and Scheduling device 32. The illustrated packet 40 in the example of FIG. 3 contains four audio information packets 42-45 originating from four different users from the user receiving this. Each packet contains a corresponding tag that was attached at the infrastructure 18.

As shown in FIG. 3 the speech rate of each packet is also shown. Determination of the packet speech rate is accomplished by the De-tagging and Scheduling device 32 when the packet is received. Particularly for the wireless CDMA domain, variable rate vocoders are utilized having determined discrete values of full rate (e.g., 8 kilobits per second), half rate (e.g., 4 kilobits per second), ¼ rate (e.g., 2 kilobits per second) and ⅛ rate (e.g., 1 kilobit per second). For periods when the originating user is inputting a high level of audio energy into the system, full rate encoding/decoding is used whereas during periods of silence or pauses in speech a lower rate such as ⅛ rate, for example, would be selected by the vocoder. A shown in the example of FIG. 3, the packets 42 and 44, which are received first and third in order, were encoded at full rate. The second received packet 43 was encoded at ⅛ rate and the fourth received packet 45 was encoded at ¼ rate.

According to an exemplary algorithm utilized in the De-tagging and Scheduling device 32, packets 42-45 are queued according to their data encoding rates. Accordingly, packets 42 and 44, both would receive higher priority than the other lower rate packets received. Among packets 42 and 44 having the same data rate, the sequential ordering is based on the order received. Accordingly, as shown in the buffer queue 46, packet 42 is placed first in the queue 46 and packet 44 placed second. Next, those packets having the next highest encoding data rate, namely packet 45, is placed third in the queuing order with packet 43 being placed last as it has the lowest encoded data rate. The reason for this ordering of data rates is to ensure that those packets having the most audio information in a given sampling period are encoded first before those packets having less audio information. This ensures that the quality of speech is high since the more crucial audio packets having greater speech information (as compared to pauses or silence) will have a greater likelihood of being encoded and not dropped.

It is noted that the decoding device 30 is associated with each particular user connected to the multi-party conference call. For mobile users and Voice over IP users, the decoding device 30 may be configured as hardware or as software that is implemented within the respective mobile telephone or Internet phone. For traditional landline based participants, the decoding device 30 would be located at the PSTN to which the landline user is connected.

Since the task scheduling algorithm can be adopted to run the multiple decoders 32 in a standard fashion based on the packets' associated speech rates this will ensure higher speech quality as well as lower delays.

An example of an overall configuration of a network utilizing the disclosed teleconference bridge 18 is shown. As illustrated, a mobile server 50 that serves a number of mobile users 52 is connected to the teleconference bridge 18 via an intermediate transport network 54 that is the equivalent of the previously illustrated network 16. Each of the mobile users 52 includes a decoding device 30 such as that as illustrated in FIG. 2. With respect to landline users 58, a PSTN 56 is connected to the teleconference bridge 18 via a frame pipe 60 that both transmits and receives PCM type audio information. Accordingly, for transmissions from the teleconference bridge 18 to the PSTN 56, the teleconference bridge 18 serves as a decoder, preferably accomplished by the controller 28, in order to decode the assembled packets and subsequently encode the information to a compressed PCM signal format recognizable by the PSTN 56.

Figure 4:
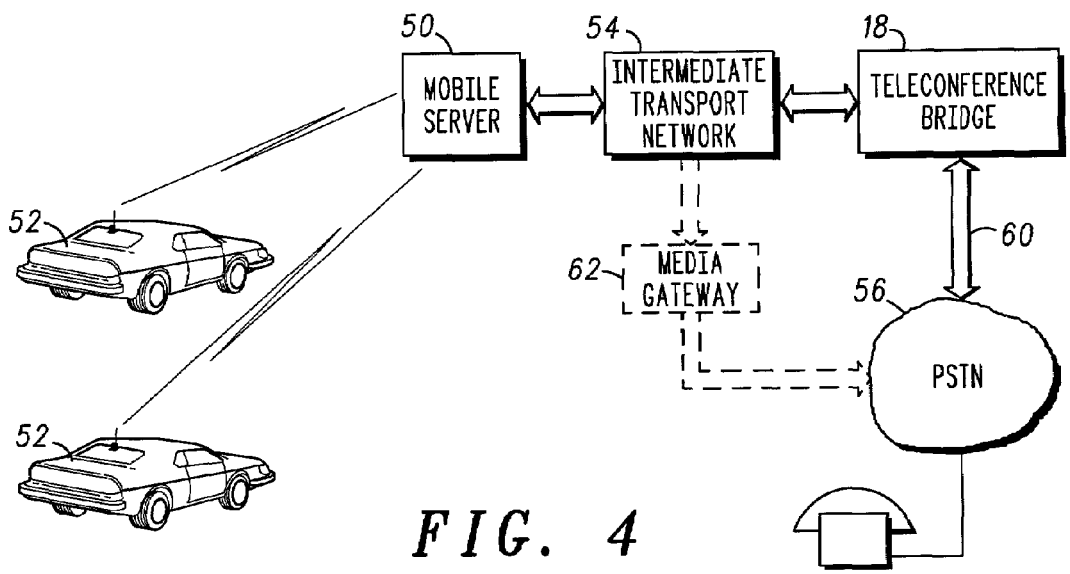
FIG. 4 illustrates an overall system diagram showing connections between the teleconferencing bridge and various end destinations in accordance with the teachings of the present disclosure.

Alternatively, signals having landline user 58 destinations may be transmitted as packet based information over the intermediate transport network 54 to a media gateway 62 as illustrated in FIG. 4. The media gateway 62 is comprised of one or more decoders that decode the packet based information and, in turn, encode the signals in a compressed PCM format that is transmitted to the PSTN 56. The media gateway 62 may be located external to the PSTN 56 or may be contained within the PSTN 56.

In conclusion, the apparatus and method in accordance with the teachings of the present invention as disclosed avoids tandem vocoding for mobile and voice over IP users that traditionally was performed by conventional teleconferencing bridges. Accordingly, the system resources are not taxed thereby saving cost as well as increasing the quality of service particularly for mobile and other packet based users of multi-party conferencing systems.

While the teachings of the invention have been explained with the respect to particular examples, it will be apparent to those of ordinary skill in the art that the scope of the disclosure is not limited to those examples. On the contrary, this application covers all apparatuses and methods falling within the spirit and scope of the appended claims, either literally or under the doctrine of equivalents.

What is claimed is:

1. An apparatus for multi-party communication in a communication system comprising:
   a multi-party communication device accepting a plurality of types of communication signals from multiple parties via a transport network, the multi-party communication device including:
   one or more tagging devices that are each respectively tagging incoming communication signals with a tag of predetermined information particular to each signal; and
   a controller combining the tagged output signals from the one or more tagging devices into data packet signals and transmit the data packet signals to each of the multiple parties via the transport network, and
   wherein a first type of signals of the plurality of types of signals is packet based signals and a second type of signals of the plurality of types of signals is pulse code modulated signals.

2. The apparatus according to claim 1 wherein the packet based signals are received from at least one of wireless mobile stations and voice over IP users and the pulse code modulated signals are received from PSTN landline users.

3. The apparatus according to claim 1 further comprising:
   one or more expanders each decoding received pulse code modulated signals;
   a summing device receiving and summing the decoded signals output from the one or more expanders; and
   an encoder receiving the summed signal from the summing device, encoding the signal for packet based transmission and tagging the encoded packet based signal with predetermined information particular to the encoded packet based signal.

4. The apparatus according to claim 1, further comprising:
   one or more decoding devices wherein each of the one or more decoding devices being associated with a corresponding one of the multiple parties and receiving the signals transmitted by the multi-party communication device via the transport network and wherein each of the one or more decoding devices including:
   a plurality of decoders decoding signals; and
   a de-tagging and scheduling device receiving the data packet signals, reading the predetermined information contained in the tags and scheduling a queue that determines a sequential order according to which packets are sent to the decoders and also addresses which of the plurality of decoders that a particular signal is to be sent.

5. The apparatus according to claim 4, wherein each of the plurality of decoders decoding a corresponding type of signal according to a predetermined decoding algorithm and also decoding multiple signals that are of the same type, but having differing parameters.

6. The apparatus according to claim 5, wherein each of the plurality of decoders includes a plurality of predetermined thread logic routines that each correspond to a signal of the multiple signals that are of the same type, but have different parameters.

7. The apparatus according to claim 4, wherein each of the one or more decoding devices is assigned to one of a corresponding end user and a PSTN using the multi-party communication device.

8. The apparatus according to claim 4, wherein the tagging and scheduling device schedules the queue for decoding incoming signals based on a task scheduling algorithm wherein the signals to be decoded are ordered according to a speech rate of the packet.

9. The apparatus according to claim 8, wherein packets having higher speech rates are given higher queue priority over packets having lower speech rates during a given sampling period.

10. The apparatus according to claim 4, wherein each of the one or more decoding devices further decoding all signals except for the signal that originated with the particular user associated with decoding device.

11. The apparatus according to claim 4, wherein each of the one or more decoding devices is included within at least one of a mobile telephone, an Internet phone and a PSTN.

12. The apparatus according to claim 4, wherein the controller
   creating a call control table that tracks a number of participants in a current multi-party call in order to determine when existing participants drop out of the current multi-party call and when new participants join the multi-party call; and relaying information within the control table to the one or more decoding devices via the transport network.

13. The apparatus according to claim 1, wherein the controller combining the tagged output signals by multiplexing the packets to form a single superpacket.

14. The apparatus according to claim 1, wherein the multi-party communication device is further omitting a respective user's voice signal from a signal sent by the controller via the transport network to that particular user.

15. The apparatus according to claim 1, wherein the tag includes one or more of a user ID, a type of encoding particular to the signal and a particular network of the originating user.

16. A method for multi-party conferencing in a communication network, the method comprising the steps of:
   receiving a plurality of types of communication signals within a multi-party communication infrastructure from multiple parties via a transport network in communication with the infrastructure, wherein a first type of signals of the plurality of types of signals are packet based signals and a second type of signals of the plurality of signals are pulse code modulated signals;
   decoding the received pulse code modulated signals;
   summing the decoded pulse code modulated signals to achieve a single combined signal;
   encoding the single combined signal for packet based transmission and tagging the resulting encoded single combined signal with predetermined information particular to the encoded single combined signal;
   tagging received communication signal with a corresponding tag that includes predetermined information particular to each signal;
   combining the tagged output signals into a single data packet; and
   transmitting the single data packet to the multiple parties over the transport network to effect a multi-party communication session.

17. The method according to claim 16 wherein the packet based signals are received from at least one of wireless mobile stations and voice over IP users and the pulse code modulated signals are received from PSTN landline users.

18. The method according to claim 16, further comprising the steps of:
   receiving the tagged communication signals via the transport network within a decoding device, wherein the tagged communication signals are de-tagged so as to extract the predetermined information within the tag and wherein the decoding device includes a plurality of decoders; and scheduling the communication signals for decoding by one of the plurality of decoders based on the tag information according to a predetermined queuing scheme.

19. The method according to claim 18, wherein each of the plurality of decoders handling a corresponding type of signal and decoding multiple signals that are of the same type.

20. The method according to claim 19, wherein each of the plurality of decoders includes a plurality of predetermined thread logic routines that each correspond to a signal of the multiple signals that are of the same type.

21. The method according to claim 18, wherein the decoding device is assigned to a corresponding end user connected to the multi-party communication device.

22. The method according to claim 18, wherein the queue is scheduled to decode incoming signals based on a task scheduling algorithm wherein the signals to be decoded are ordered according to a speech rate of the packet.

23. The method according to claim 22, wherein packets having higher speech rates are given higher queue priority over packets having lower speech rates during a given sampling period.

24. The method according to claim 18, wherein the decoding device is further decoding all signals except for the signal that originated with the particular user associated with a corresponding decoding device.

25. The method according to claim 18, wherein the decoding device is included within at least one of a mobile telephone, an Internet phone and a PSTN.

26. The method according to claim 18, further comprising the steps of:

creating a call control table that tracks a number of participants in the multi-party call in order to track when users drop out of the multi-party call and when new users join the multi-party call; and relaying information from the control table to the decoding device via the transport network.

27. The method according to claim 16, wherein the packets are combined by multiplexing the packets to a form a single super packet.

28. The method according to claim 16 further comprising the step of:

omitting a respective user's voice signal from a signal sent by the controller via the transport network to that particular user.

29. The method according to claim 16, wherein the tag includes one or more of a user ID, a type of encoding particular to the signal, and a particular network of the originating user.

* * * * *